United States Patent
Wendzel et al.

(10) Patent No.: US 10,876,625 B2
(45) Date of Patent: Dec. 29, 2020

(54) TRANSMISSION CONTROL METHOD

(71) Applicant: ZF Friedrichshafen AG, Friedrichshafen (DE)

(72) Inventors: Andreas Wendzel, Grünkraut (DE); Matthias Reisch, Ravensburg (DE); Gregor Stoelcker, Berlin (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/430,644

(22) Filed: Jun. 4, 2019

(65) Prior Publication Data
US 2019/0368603 A1 Dec. 5, 2019

(30) Foreign Application Priority Data
Jun. 4, 2018 (DE) .................. 10 2018 208 764

(51) Int. Cl.
*F16H 61/04* (2006.01)
*F16H 61/02* (2006.01)
*F16H 63/50* (2006.01)
*B60W 10/06* (2006.01)
(Continued)

(52) U.S. Cl.
CPC ......... *F16H 61/0213* (2013.01); *B60W 10/06* (2013.01); *B60W 10/11* (2013.01);
(Continued)

(58) Field of Classification Search
CPC ......... F16H 2061/0418; F16H 2306/48; F16H 61/0403; F16H 2061/0407; F16H 61/688; B60W 30/19
See application file for complete search history.

(56) References Cited

U.S. PATENT DOCUMENTS 6,712,734 B1    3/2004  Loeffler
6,941,830 B2 *  9/2005  Ibamoto ............... B60K 6/48
                                           477/4
(Continued)

FOREIGN PATENT DOCUMENTS

DE    19850549 A1     5/2000
DE    10037134 A1 *   6/2002  ............. F16H 3/006
(Continued)

OTHER PUBLICATIONS

German Search Report DE102018208764.4 dated Oct. 25, 2018. (12 pages).

*Primary Examiner* — Sherry L Estremsky
(74) *Attorney, Agent, or Firm* — Dority & Manning, P.A.

(57) ABSTRACT

A method for operating a transmission for a motor vehicle having an input shaft, a first shaft connectable to the input shaft via a first input clutch and a second shaft connectable to the input shaft via a second input clutch, a plurality of gearshift clutches, and an output shaft. Different gear ratios between the input and output shafts are implementable by selective engagement of the plurality of clutches. A first torque transmission path between the first and second shafts is engageable with a first friction-locking clutch and a second torque transmission path between the first and second shafts is engageable with a second friction-locking clutch. The method includes actuating, at least intermittently during a synchronization phase in an upshift process of the transmission, the first friction-locking clutch to transmit a first torque and the second friction-locking clutch to transmit a second torque.

13 Claims, 4 Drawing Sheets

(51) Int. Cl.
*B60W 10/11* (2012.01)
*B60W 30/18* (2012.01)
*B60W 30/19* (2012.01)
*F16H 59/44* (2006.01)
*F16H 59/46* (2006.01)
*F16H 59/14* (2006.01)
*F16H 59/70* (2006.01)

(52) U.S. Cl.
CPC ...... B60W 30/18072 (2013.01); B60W 30/19 (2013.01); F16H 63/502 (2013.01); *B60W 2510/0657* (2013.01); *B60W 2510/1005* (2013.01); *B60W 2520/10* (2013.01); *B60W 2710/0666* (2013.01); *B60W 2710/1005* (2013.01); *F16H 59/14* (2013.01); *F16H 59/44* (2013.01); *F16H 59/46* (2013.01); *F16H 59/70* (2013.01); *F16H 2059/147* (2013.01); *F16H 2061/0234* (2013.01); *F16H 2306/48* (2013.01)

(56) References Cited

U.S. PATENT DOCUMENTS

| | | | | |
|---|---|---|---|---|
| 7,097,584 | B2 * | 8/2006 | Kuhstrebe | F16H 3/006 475/218 |
| 7,845,246 | B2 * | 12/2010 | Tsukada | F16H 3/006 74/330 |
| 8,909,447 | B2 * | 12/2014 | Schneider | B60W 10/06 701/68 |
| 9,291,243 | B2 * | 3/2016 | Borntraeger | F16H 1/28 |

FOREIGN PATENT DOCUMENTS

| | | | |
|---|---|---|---|
| DE | 10225331 A1 | 12/2003 | |
| DE | 102009031786 A1 | 1/2011 | |
| DE | 102012003440 A1 | 8/2013 | |
| EP | 3499088 A1 * | 6/2019 | ............ F16H 3/12 |
| WO | WO 2011/003492 | 1/2011 | |

* cited by examiner

TRANSMISSION CONTROL METHOD

FIELD OF THE INVENTION

The invention relates generally to a method for operating a transmission of a motor vehicle, in particular for a dual clutch transmission. Moreover, the invention relates to a control unit for the open-loop control of the aforementioned method, and to a motor vehicle transmission having such a control unit.

BACKGROUND

Patent application DE 102 25 331 A1 describes a powershift transmission having central synchronization. The powershift transmission includes two input shafts, a countershaft, and an auxiliary shaft. Two synchronizing elements, which are arranged on the auxiliary shaft, are provided for the central synchronization of the shift elements, which are unsynchronized. The two synchronizing elements are provided for establishing a torque transmission between the input shafts. By actuating the synchronizing elements, a synchronization of the shift elements is carried out during an upshift process as well as during a downshift process, due to the fact that energy is transferred between a load-transmitting power path of the transmission and a non-load-transmitting power path of the transmission. This energy transfer acts on the output shaft of the transmission, however, via the load-transmitting power path. However, particularly at low vehicle speeds and at low drive power, this energy transfer can negatively influence the shifting comfort.

The problem addressed by the invention is therefore that of providing a method, with the aid of which shifting comfort can be improved for a powershift transmission having this type of central synchronization.

SUMMARY OF THE INVENTION

A method for operating a motor vehicle transmission is provided, which includes an input shaft, a first and a second input clutch, a first and a second input shaft, a plurality of gearshift clutches, and an output shaft. The input shaft is connectable to the first shaft by engaging the first input clutch. The input shaft is connectable to the second shaft by engaging the second input clutch. Different gear ratios between the input shaft and the output shaft are implementable by selective engagement of the plurality of gearshift clutches and the first and second input clutches. Moreover, at least one first and one second engageable torque transmission path are provided between the two input shafts. Each of the two torque transmission paths includes a friction-locking clutch for establishing the torque transmission, where each of the friction-locking clutches for establishing the torque transmission is expressly not one of the two input clutches.

According to the invention, it is now provided that, during a synchronization phase in an upshift process of the motor vehicle transmission, not only one, but rather both friction-locking clutches are actuated in order to transmit a torque. This is the case because, for the purpose of synchronization during an upshift process, energy is drawn from the non-load-transmitting power path. By actuating both friction-locking clutches, this energy, as reactive power, is dissipated in the form of heat, instead of the energy being fed to the load-transmitting power path. As a result, the energy transfer to the load-transmitting power path is reduced at least to the extent that the energy transfer is no longer noticeable to the driver of the motor vehicle.

Preferably, both friction-locking clutches are actuated at the beginning of the synchronization phase of the upshift, so that the energy input into the load-transmitting power path is minimized or completely avoided at the beginning of the gear ratio change operation.

Alternatively, only one of the two friction-locking clutches are actuated at the beginning of the synchronization phase of the upshift. This can be useful, in particular, during an upshift process in which adjacent gear ratios in the gear ratio range are jumped over. Adjacent gear ratios in the gear ratio range are, for example, the first gear ratio and the second gear ratio; or the second gear ratio and the third gear ratio, etc. This is the case because the compensation effect of the actuation of the two friction-locking clutches is limited by the transmission ratios of the torque transmission paths. If the differential speed to be synchronized is greater than the transmission ratios of the torque transmission paths, it is provided to actuate only one of the two friction-locking clutches at the beginning of the synchronization phase, wherein an energy transfer into the load-transmitting power path takes place. If the differential speed between the input shafts reaches a defined limiting value, the other of the friction-locking clutches is additionally activated, so that the energy transfer into the load-transmitting power path is avoided or reduced at least for a part of the gear ratio change operation. In order to be able to ensure a comfortable gear ratio change operation, the torque of the friction-locking clutch that is activated at the beginning of the synchronization phase is initially kept low. As a result, the synchronization phase is temporally prolonged, so that the energy transfer into the load-transmitting power path takes place with a lower value. If the defined limiting value of the differential speed is reached and, therefore, the other friction-locking clutch is activated, the torque of the originally synchronizing friction-locking clutch is increased.

As described at the outset, the provided method is utilized primarily for improving shifting comfort. In driving situations in which an energy transfer into the load-transmitting power path either does not interfere or is even desirable, it is conceivable to actuate only one of the two friction-locking clutches during an upshift process. For example, the provided method is carried out during an upshift in the coasting condition of the motor vehicle, but not in the traction operation. A dependence on the current drive torque is also conceivable, so that the method according to the invention is carried out only at a drive torque that is less than a limiting value. The speed of the motor vehicle is one further possible dependence for carrying out the method, so that the method is carried out only at a vehicle speed that is less than or equal to a limiting value.

According to one possible embodiment of the method, the drive torque of the motor vehicle is reduced during the synchronization phase. As a result, it is possible to introduce the energy released during the synchronization process into the load-transmitting power path of the transmission without this resulting in a change of the torque present at the output shaft. Since the dynamics and accuracy of a change of the drive torque are limited, however, the method according to the invention generally cannot be completely replaced by this measure. However, the power limits of the friction-locking clutches are reduced by this measure, since now more of the energy transfer is to be converted into reactive power.

A control unit is provided, which is configured for the open-loop control of the above-described method and its preferred versions. In particular, the control unit is an electronic control unit which preferably has a communication link with a hydraulic control unit. In some embodiments, the electronic control unit and the hydraulic control unit are integral parts of the motor vehicle transmission.

BRIEF DESCRIPTION OF THE DRAWINGS

Exemplary embodiments of the invention are described in detail in the following with reference to the attached figures. Wherein.

DETAILED DESCRIPTION

Figure 1:
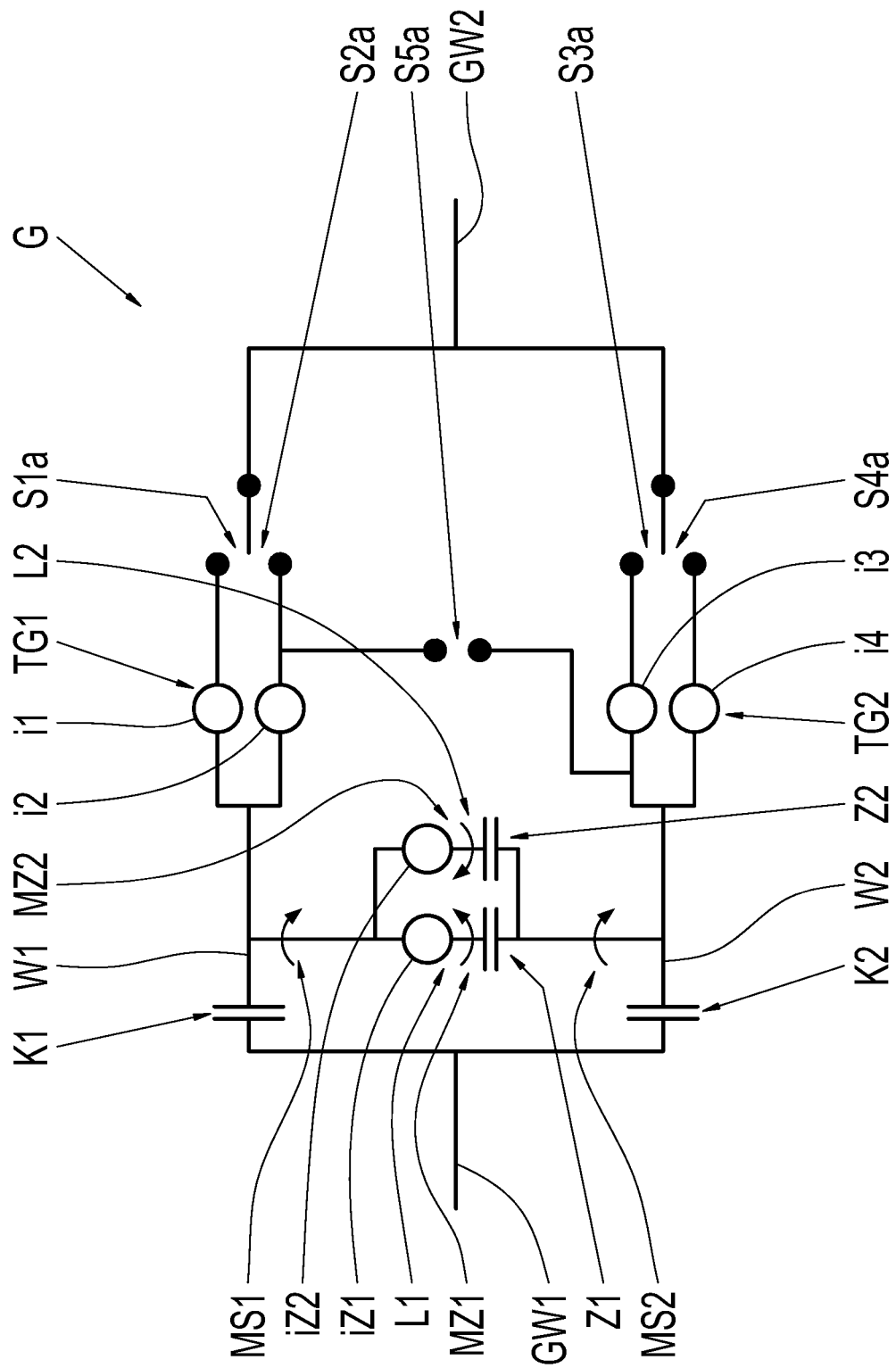
FIG. 1 shows an abstract representation of a transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows an abstract representation of a transmission G. The transmission G includes an input shaft GW1, a first sub-transmission TG1, a second sub-transmission TG2, a plurality of unsynchronized form-locking gearshift clutches including first, second, third, fourth, and fifth gearshift clutches S1a, S2a, S3a, S4a, S5a, and an output shaft GW2. Associated with the first sub-transmission TG1 is a first shaft W1 which can be connected to the input shaft GW1 by engaging a first input clutch K1. Associated with the second sub-transmission TG2 is a second shaft W2 which can be connected to the input shaft GW1 by engaging a second input clutch K2. The output sides of both sub-transmissions TG1, TG2 are connected to the output shaft GW2.

A first gear stage i1 and a second gear stage i2 are associated with the first sub-transmission TG1. A third gear stage i3 and a fourth gear stage i4 are associated with the second sub-transmission TG2. The first, second, third, and fourth gear stages i1, i2, i3, i4 are, for example, spur gear sets or planetary gear sets and have transmission or gear ratios which are different from one another. Different gear ratios between the input shaft GW1 and the output shaft GW2 are implemented by selective engagement of the plurality of gearshift clutches S1a, S2a, S3a, S4a, S5a and the input clutches K1, K2. The first gearshift clutch S5a connects the first and second sub-transmissions TG1, TG2, so that a power flow from the input shaft GW1 to the output shaft GW2 takes place across the second and third gear stages i2, i3 of the two sub-transmissions TG1, TG2, respectively. A gear ratio formed in this way is also referred to as a winding path gear ratio.

Moreover, the transmission G includes a first engageable torque transmission path L1 and a second engageable torque transmission path L2 between the input shafts W1, W2. The first torque transmission path L1 includes a first clutch Z1 and a first gear ratio iZ1. The second torque transmission path L2 includes a second clutch Z2 and a second gear ratio iZ2. The first clutch Z1 and the second clutch Z2 are friction-locking clutches. Similar to the gear stages i1, i2, i3, i4, the first gear ratio iZ1 and the second gear ratio iZ2 are spur gear sets or planetary gear sets.

The two torque transmission paths L1, L2 are utilized for synchronizing ones of the plurality of gearshift clutches S1a, S2a, S3a, S4a, S5a. If, for example, the first input clutch K1 and the first gearshift clutch S1a are engaged and the second input clutch K2 is disengaged, a respective torque MZ1, MZ2 can be transmitted from the first shaft W1 to the second input shaft W2 by suitably actuating the first clutch Z1 or the second clutch Z2, in order to accelerate or decelerate the second input shaft W2, as necessary, to a target rotational speed, in order be able to engage, for example, the third gearshift clutch S3a, while the input clutch K2 is disengaged. The first and second gear ratios iZ1, iZ2 are different from one another in this case. By way of example, the first torque transmission path L1 is utilized for accelerating the second input shaft W2 relative to a rotational speed of the first shaft W1, and the second torque transmission path L2 is utilized for decelerating the second input shaft W2 relative to the rotational speed of the first shaft W1. If the second input shaft W2 has reached its target rotational speed, the third gearshift clutch S3a can be engaged. A gear ratio change can now take place by simultaneously disengaging the first input clutch K1 and engaging the second input clutch K2 without interrupting the tractive force between the input shaft GW1 and the output shaft GW2. The arrow directions of the torques MZ1, MZ2 indicated in FIG. 1 are utilized merely for the purpose of illustration and are not restrictive.

In the same way, the two torque transmission paths L1, L2 are utilized for accelerating or decelerating the first shaft W1 to a target rotational speed. The first torque transmission path L1 is now utilized for decelerating the first shaft W1 relative to the rotational speed of the second input shaft W2, and the second torque transmission path L2 is now utilized for accelerating the first shaft W1 relative to the rotational speed of the second input shaft W2. In this way, the particular gearshift clutches of the plurality of gearshift clutches S1a, S2a, S3a, S4a, S5a to be engaged are synchronized during an upshift process as well as during a downshift process. The two torque transmission paths L1, L2 are not utilized in this case, by way of example, for implementing gear ratios. Given an appropriate configuration of the clutches Z1, Z2, at least one of the torque transmission paths L1, L2 can also be utilized for implementing gear ratios, however.

The synchronizing torque applied to the particular sub-transmission TG1, TG2 is marked as MS1, MS2, respectively. The arrow directions of the synchronizing torques MZ1, MZ2 indicated in FIG. 1 are utilized merely for the purpose of illustration and are not restrictive. The synchronizing torques MS1, MS2 are dependent on the torques MZ1, MZ2 of the clutches Z1, Z2 and on the gear ratios iZ1, iZ2. The dependencies are set out in the equations (1), (2).

$$MS1 = \frac{MZ1}{iZ1} + \frac{MZ2}{iZ2} \qquad (1)$$

$$MS2 = MZ1 + MZ2 \qquad (2)$$

If a gear ratio is now engaged, for example, in the first sub-transmission TG1, and the second input shaft W2 is to be decelerated to a target rotational speed as part of an upshift, the deceleration of the second input shaft W2 is not to act on the torque of the first shaft W1. In other words, the synchronizing torque MS2 is to be equal to zero. The torques MZ1, MZ2 at the clutches Z1, Z2 required for this purpose are set out in the equations (3), (4).

$$MZ1 = MS2 - MZ2 \quad (3)$$

$$MZ2 = \frac{MS2}{1 - \left(\frac{iZ1}{iZ2}\right)} \quad (4)$$

Figure 2:
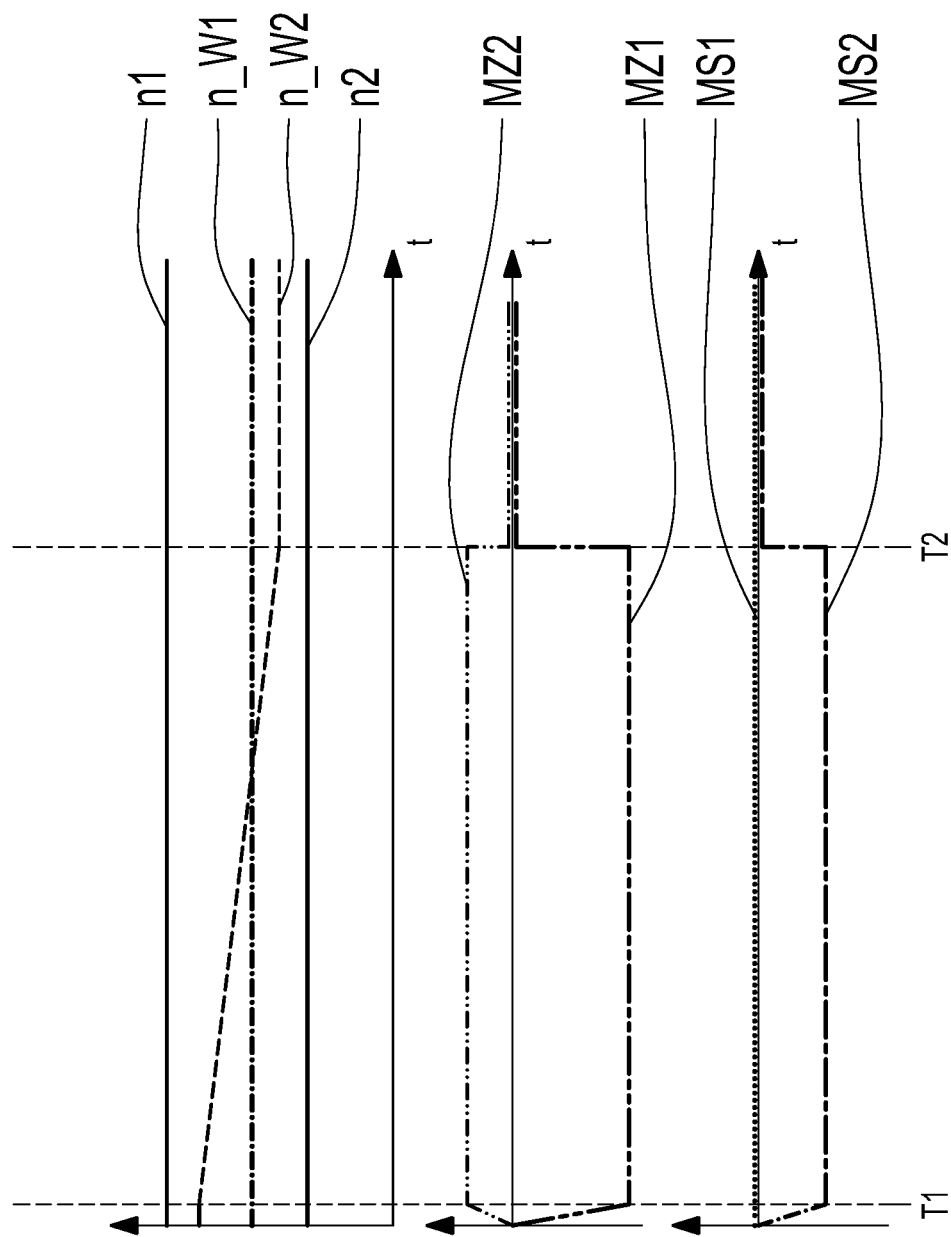
FIG. 2 shows a first time profile of different parameters of the transmission.

FIG. 2 shows a first time profile of different condition parameters of the transmission G, including a rotational speed n_W1 of the first shaft W1, a rotational speed n_W2 of the second shaft W2, a first limit speed n1, a second limit speed n2, the torques MZ1, MZ2 at the first and second clutches Z1, Z2, and the synchronizing torques MS1, MS2. The absolute value of the limit speeds n1, n2 is dependent on the gear ratios iZ1, iZ2.

At a point in time T1, the rotational speed n_W2 of the second shaft W2 is to be decelerated for an upshift, while the rotational speed n_W1 of the first shaft W1 is to remain constant, by way of example. At the point in time T1, the rotational speed n_W2 of the second shaft W2 is less than the first limit speed n1, and so both friction-locking clutches Z1, Z2 are actuated in order to transmit a torque MZ1, MZ2, respectively. The absolute value of the torques MZ1, MZ2 is selected in such a way, in this case, that the synchronizing torque MS1 remains equal to zero. At the point in time T2, the rotational speed n_W2 of the second shaft W2 reaches its target rotational speed, whereupon the first and second clutches Z1, Z2 are disengaged. The target rotational speed of the rotational speed n_W2 of the second shaft W2 corresponds to a synchronous speed at the gearshift clutch of the second sub-transmission TG2 to be engaged for the upshift, i.e., for example, one of the third or fourth gearshift clutches S3a, S4a. After the point in time T2, the third or fourth gearshift clutch S3a, S4a to be engaged is engaged.

Figure 3:
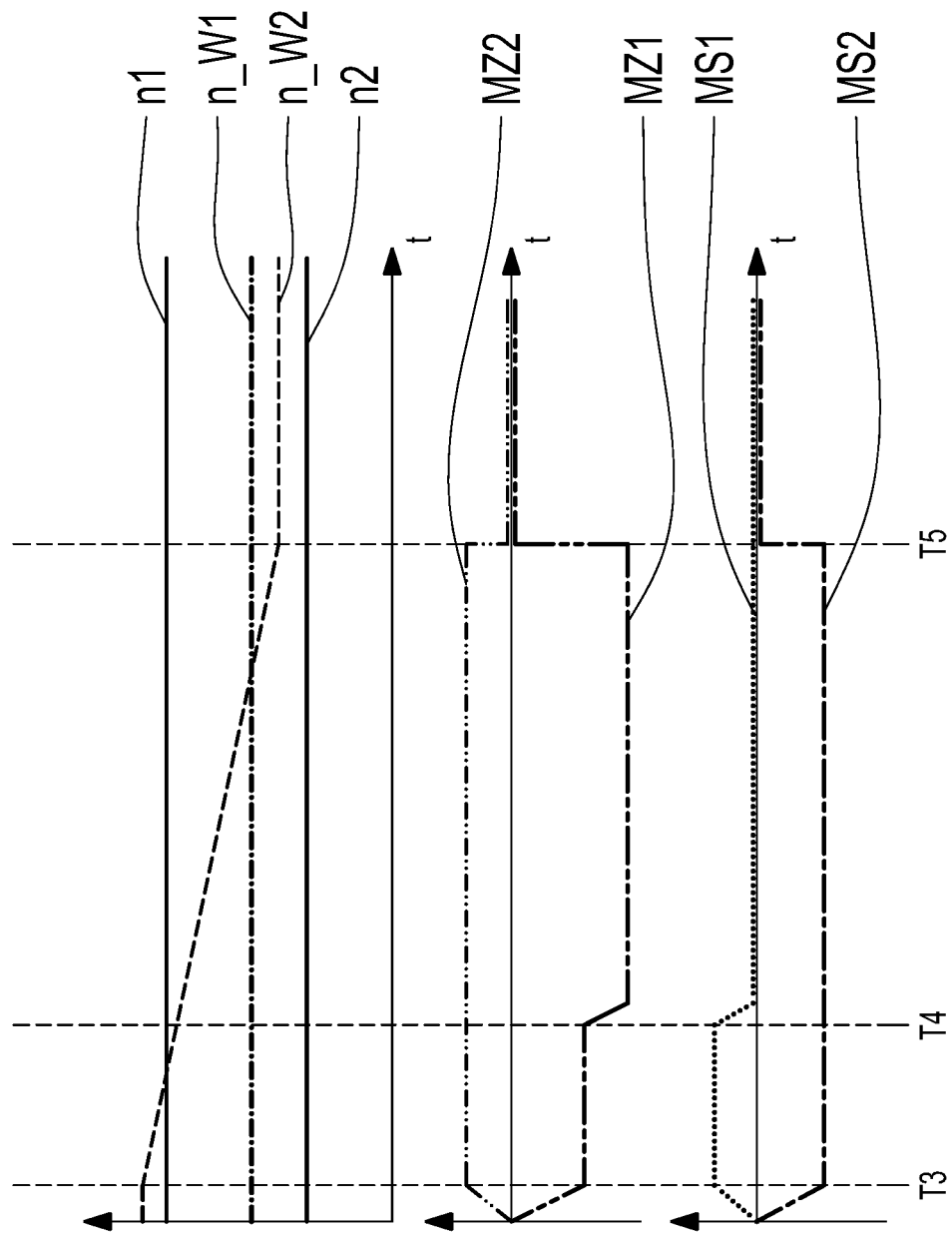
FIG. 3 shows a second time profile of the different parameters of the transmission shown in FIG. 2.

FIG. 3 shows a second time profile of the same condition parameters as in FIG. 2. At a point in time T3, the rotational speed n_W2 of the second shaft W2 is to be decelerated for an upshift, while the rotational speed n_W1 of the first shaft W1 is to remain constant, by way of example. At the point in time T3, the rotational speed n_W2 of the second shaft W2 is greater than the first limit speed n1, so, initially, only the first clutch Z1 is actuated in order to transmit a torque MZ1. This results in a reaction torque onto the first sub-transmission TG1, since the synchronizing torque MS1 becomes greater than zero. At a point in time T4, the rotational speed n_W2 of the second shaft W2 reaches the first limit speed n1, whereupon the second clutch Z2 is also actuated in order to transmit a torque MZ2. At the same time, the absolute value of the torque MZ1 is increased. As a result, the synchronizing torque MS1 becomes zero again, and so no reaction torque of the synchronization process acts on the first sub-transmission TG1. At the point in time T5, the rotational speed n_W2 of the second shaft W2 reaches its target rotational speed, whereupon the first and second clutches Z1, Z2 are disengaged. The target rotational speed of the rotational speed n_W2 of the second shaft W2 corresponds to a synchronous speed at the gearshift clutch of the second sub-transmission TG2 to be engaged for the upshift, i.e., for example, one of the third or fourth gearshift clutches S3a, S4a. After the point in time T5, the third or fourth gearshift clutch S3a, S4a to be engaged is engaged.

Figure 4:
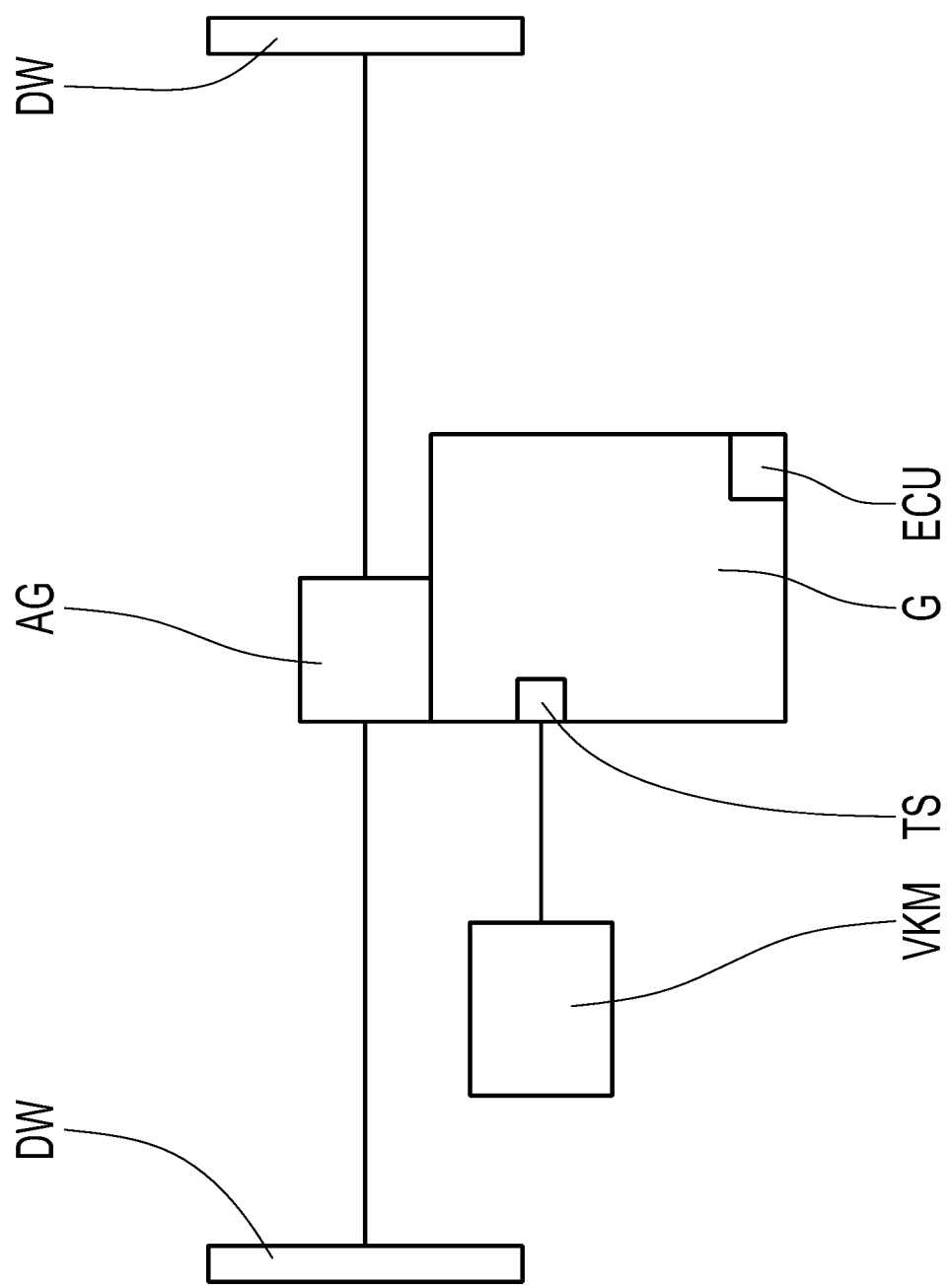
FIG. 4 shows a drive train for a motor vehicle.

FIG. 4 shows a drive train for a motor vehicle, wherein an internal combustion engine VKM is connected to the transmission G via an intermediate torsional damper TS. Connected downstream from the transmission G, on the output end thereof, is a differential gear AG, via which drive power is distributed to driving wheels DW on a drive axle of the motor vehicle. The transmission G and the torsional damper TS are arranged in a common housing of the transmission G, into which the differential gear AG can also be integrated. As is also apparent in FIG. 4, the internal combustion engine VKM, the torsional damper TS, the transmission G, and the differential gear AG are aligned transversely to a direction of travel of the motor vehicle.

The transmission G includes a control unit ECU which is configured, at least, for the open-loop control of the first and second friction-locking clutches Z1, Z2. A characteristic map can be stored on the control unit ECU, which is utilized for the open-loop control of the first and second friction-locking clutches Z1, Z2. Preferably, the control unit ECU is also configured for the open-loop control of further functions of the transmission G.

Modifications and variations can be made to the embodiments illustrated or described herein without departing from the scope and spirit of the invention as set forth in the appended claims.

REFERENCE CHARACTERS

G transmission
GW1 input shaft
GW2 output shaft
TG1 first sub-transmission
TG2 second sub-transmission
K1 first input clutch
K2 second input clutch
W1 first shaft
n_W1 rotational speed of the first input shaft
W2 second shaft
n_W2 rotational speed of the second input shaft
S1a-S5a separating clutches
i1-i4 gear stages
L1, L2 torque transmission paths
iZ1, iZ2 gear ratios of the torque transmission paths
n1, n2 limit speeds
Z1, Z2 friction-locking clutches
MZ1, MZ2 torque
MS1, MS2 synchronizing torque
ECU control unit
VKM internal combustion engine
TS torsional damper
AG differential gear
DW driving wheel

The invention claimed is:

1. A method for operating a transmission (G) for a motor vehicle, the transmission (G) comprising an input shaft (GW1), a first shaft (W1) connectable to the input shaft (GW1) via a first input clutch (K1), a second shaft (W2) connectable to the input shaft (GW1) via a second input clutch (K2), a plurality of gearshift clutches (S1a, S2a, S3a, S4a, S5a), and an output shaft (GW2), wherein different gear ratios between the input shaft (GW1) and the output shaft (GW2) are implementable by selective engagement of the plurality of gearshift clutches (S1a, S2a, S3a, S4a, S5a) and the first and second input clutches (K1, K2), wherein a first torque transmission path (L1) and a second torque transmission path (L2) are provided between the first shaft (W1) and the second shaft (W2), the first torque transmission path is engageable with a first friction-locking clutch (Z1) and the second torque transmission path (L2) is engageable with a second friction-locking clutch (Z2), the method comprising:

actuating, during a synchronization phase in an upshift process of the transmission (G), both of the first and second friction-locking clutches (Z1, Z2), at least intermittently, in order to transmit a first torque (MZ1) from the first friction-locking clutch (Z1) and a second torque (MZ2) from the second friction-locking clutch (Z2).

2. The method of claim 1, wherein actuating the first and second friction-locking clutches (Z1, Z2) comprises actuating the first and second friction-locking clutches (Z1, Z2) such that a torque present at the output shaft (GW2) is not influenced or is only slightly influenced by the actuation of the first and second friction-locking clutches (Z1, Z2).

3. The method of claim 1, wherein, at the beginning of the synchronization phase, the first and second friction-locking clutches (Z1, Z2) are both actuated to transmit the respective first and second torques (MZ1, MZ2).

4. The method of claim 1, wherein, at the beginning of the synchronization phase, only one of the first friction-locking clutch (Z1) or the second friction-locking clutch (Z2) is actuated to transmit the respective first or second torque.

5. The method of claim 4, wherein, upon reaching or falling below a defined differential speed of the first and second shafts (W1, W2), the other of the first friction-locking clutch (Z1) or the second friction-locking clutch (Z2) is additionally actuated to transmit the respective first or second torque.

6. The method of claim 5, wherein the respective first or second torque (MZ1, MZ2) of the one friction-locking clutch (Z1, Z2) actuated at the beginning of the synchronization phase is increased after the other friction-locking clutch (Z1, Z2) is actuated in order to transmit the other of the respective first or second torque upon reaching or falling below the defined differential speed.

7. The method of claim 1, wherein, when the upshift process of the transmission (G) is an upshift in a coasting condition of the motor vehicle, the method further comprises actuating, during a synchronization phase in an upshift in a traction operation of the motor vehicle, only one of the first friction-locking clutch (Z1) or the second friction-locking clutch (Z2).

8. The method of claim 1, wherein the method is carried out depending on a current drive torque of the motor vehicle.

9. The method of claim 8, wherein, when the upshift process of the transmission (G) is an upshift in a coasting condition of the motor vehicle, the method further comprises actuating, during a synchronization phase in an upshift in a traction operation of the motor vehicle, only one of the first friction-locking clutch (Z1) or the second friction-locking clutch (Z2) when the current drive torque of the motor vehicle reaches or exceeds a limiting value.

10. The method of claim 1, wherein the method is carried out depending on a current gear ratio of the motor vehicle transmission (G), a speed of the motor vehicle, or both the current gear ratio of the motor vehicle transmission (G) and the speed of the motor vehicle.

11. The method of claim 1, wherein a drive torque of the motor vehicle is reduced during the synchronization phase.

12. A control unit (ECU) for a motor vehicle transmission (G), wherein the control unit (ECU) is configured to perform open-loop control of the method of claim 1.

13. A motor vehicle transmission (G), comprising the control unit (ECU) of claim 12 for the open-loop control of the motor vehicle transmission (G).

* * * * *